(12) United States Patent  
Kawamura et al.

(10) Patent No.: US 8,362,726 B2  
(45) Date of Patent: Jan. 29, 2013

(54) MOTOR CONTROLLER

(75) Inventors: Satoshi Kawamura, Tokyo (JP);  
Shigenaga Yamasaki, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/203,956

(22) PCT Filed: May 8, 2009

(86) PCT No.: PCT/JP2009/002022  
§ 371 (c)(1),  
(2), (4) Date: Aug. 30, 2011

(87) PCT Pub. No.: WO2010/128538  
PCT Pub. Date: Nov. 11, 2010

(65) Prior Publication Data  
US 2011/0316459 A1    Dec. 29, 2011

(51) Int. Cl.  
*H02H 7/08* (2006.01)

(52) U.S. Cl. ............ 318/400.21; 318/400.01; 318/700

(58) Field of Classification Search ............ 318/400.01, 318/400.21, 700  
See application file for complete search history.

(56) References Cited

U.S. PATENT DOCUMENTS

| 6,900,552 | B2 * | 5/2005 | Fukano et al. ............ 290/40 C |
| 7,002,318 | B1 | 2/2006 | Schulz et al. |
| 2007/0132414 | A1 | 6/2007 | Arai et al. |
| 2008/0211439 | A1 * | 9/2008 | Yokota et al. ........... 318/400.21 |
| 2010/0060222 | A1 * | 3/2010 | Kezobo et al. ............... 318/490 |
| 2012/0068645 | A1 * | 3/2012 | Tsuji ....................... 318/400.21 |

FOREIGN PATENT DOCUMENTS

| DE | 10 2005 012 779 A1 | 10/2005 |
| DE | 10 2004 019 284 A1 | 11/2005 |
| DE | 10 2005 045 323 A1 | 4/2006 |
| DE | 10 2007 017 285 A1 | 11/2008 |
| JP | 04161082 A * | 6/1992 |
| JP | 6-249037 A | 9/1994 |
| JP | 8-149877 A | 6/1996 |
| JP | 8-331886 A | 12/1996 |
| JP | 2005-114669 A | 4/2005 |
| JP | 2008-278633 A | 11/2008 |
| WO | WO 2007/148480 A1 | 12/2007 |

* cited by examiner

*Primary Examiner* — Kawing Chan  
(74) *Attorney, Agent, or Firm* — Birch, Stewart, Kolasch & Birch, LLP

(57) ABSTRACT

When an output pattern (LLL or HHH) due to a signal with a prescribed logic level corresponding to a ground short or instantaneous interruption of an output signal line of Hall ICs 17 is supplied via the output signal lines, and if output patterns based on detection signals supplied before and after the output pattern are found to be different by comparing them, a decision is made that there is a possibility that a shift of a rotor 11 from a target position and counterrotation of the rotor 11 involved with it can occur.

6 Claims, 13 Drawing Sheets

(a)

| Hall IC Output Pattern | | | | Motor Exciting Pattern | | | |
|---|---|---|---|---|---|---|---|
| U | V | W | Hall IC_Phase | Open Valve Driving | | Close Valve Driving | |
| H | H | L | 1 | V ⇒ U | 1 | U ⇒ V | 1 |
| H | L | L | 2 | W ⇒ U | 2 | U ⇒ W | 2 |
| H | L | H | 3 | W ⇒ V | 3 | V ⇒ W | 3 |
| L | L | H | 4 | U ⇒ V | 4 | V ⇒ U | 4 |
| L | H | H | 5 | U ⇒ W | 5 | W ⇒ U | 5 |
| L | H | L | 6 | V ⇒ W | 6 | W ⇒ V | 6 |

(b)

| | Hall IC Output Pattern | | | | Motor Exciting Pattern | | | |
|---|---|---|---|---|---|---|---|---|
| | U | V | W | Hall IC_Phase | Open Valve Driving | | Close Valve Driving | |
| A | H | H | L | 1 | V ⇒ U | 1 | U ⇒ V | 1 |
| | H | L | L | 2 | | 2 | | 2 |
| | H | L | H | 3 | W ⇒ U | 3 | U ⇒ W | 3 |
| | L | L | H | 4 | | 4 | | 4 |
| | L | H | H | 5 | W ⇒ V | 5 | V ⇒ W | 5 |
| | L | H | L | 6 | | 6 | | 6 |
| B | H | H | L | 1 | U ⇒ V | 7 | V ⇒ U | 7 |
| | H | L | L | 2 | | 8 | | 8 |
| | H | L | H | 3 | U ⇒ W | 9 | W ⇒ U | 9 |
| | L | L | H | 4 | | 10 | | 10 |
| | L | H | H | 5 | V ⇒ W | 11 | W ⇒ V | 11 |
| | L | H | L | 6 | | 12 | | 12 |

▨ Portions are N-poles of Rotor

| Hall IC Output Pattern | | | | Motor Exciting Pattern | | | |
|---|---|---|---|---|---|---|---|
| U | V | W | Hall IC_Phase | Open Valve Driving | | Close Valve Driving | |
| H | H | L | 1 | V ⇒ U | 1 | U ⇒ V | 1 |
| H | L | L | 2 | W ⇒ U | 2 | U ⇒ W | 2 |
| H | L | H | 3 | W ⇒ V | 3 | V ⇒ W | 3 |
| L | L | H | 4 | U ⇒ V | 4 | V ⇒ U | 4 |
| L | H | H | 5 | U ⇒ W | 5 | W ⇒ U | 5 |
| L | H | L | 6 | V ⇒ W | 6 | W ⇒ V | 6 |

(b)

| | Hall IC Output Pattern | | | | Motor Exciting Pattern | | | |
|---|---|---|---|---|---|---|---|---|
| | U | V | W | Hall IC_Phase | Open Valve Driving | | Close Valve Driving | |
| A | H | H | L | 1 | V ⇒ U | 1 | U ⇒ V | 1 |
| | H | L | L | 2 | | 2 | | 2 |
| | H | L | H | 3 | W ⇒ U | 3 | U ⇒ W | 3 |
| | L | L | H | 4 | | 4 | | 4 |
| | L | H | H | 5 | W ⇒ V | 5 | V ⇒ W | 5 |
| | L | H | L | 6 | | 6 | | 6 |
| B | H | H | L | 1 | U ⇒ V | 7 | V ⇒ U | 7 |
| | H | L | L | 2 | | 8 | | 8 |
| | H | L | H | 3 | U ⇒ W | 9 | W ⇒ U | 9 |
| | L | L | H | 4 | | 10 | | 10 |
| | L | H | H | 5 | V ⇒ W | 11 | W ⇒ V | 11 |
| | L | H | L | 6 | | 12 | | 12 |

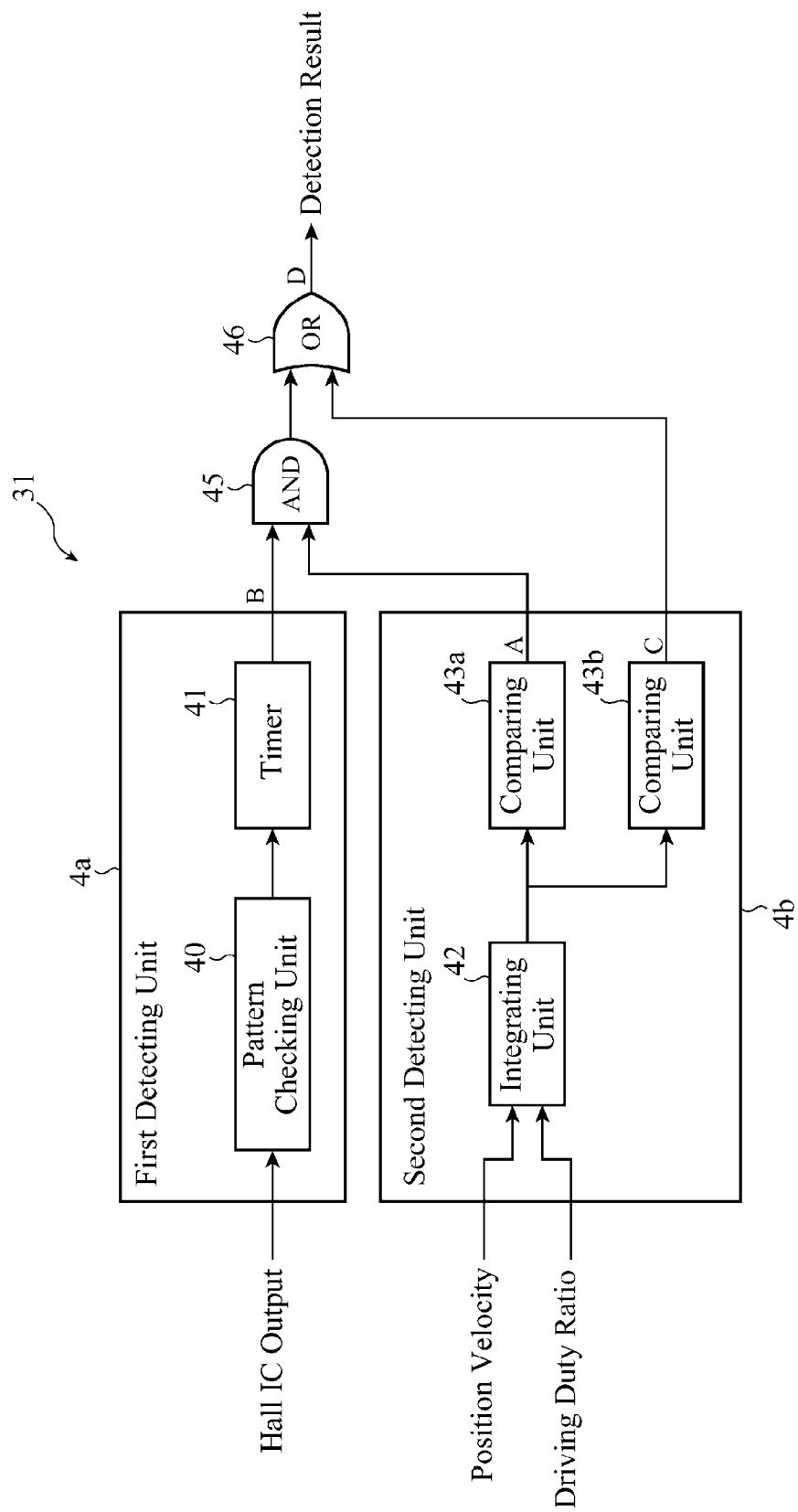

FIG.8

| | |
|---|---|
| LLL | 0 |
| HHL | 1 |
| HLL | 2 |
| HLH | 3 |
| LLH | 4 |
| LHH | 5 |
| LHL | 6 |
| HHH | 7 |

FIG.9

| Abnormality Occurrence Line/Type | Before Occurrence of Abnormality | | After Occurrence of Abnormality | | |
|---|---|---|---|---|---|
| | Operation Direction | Signal Pattern | Operation Direction | Signal Pattern | Counter-rotation |
| u-Phase GND Short | Open | 1 ⇒ 2 ⇒ 3 | Close | 6 ⇒ 0 ⇒ 4 | Occurs |
| | Close | 3 ⇒ 2 ⇒ 1 | Open | 4 ⇒ 0 ⇒ 6 | |
| u-Phase Instantaneous Interruption | Open | 4 ⇒ 5 ⇒ 6 | Close | 3 ⇒ 7 ⇒ 1 | |
| | Close | 6 ⇒ 5 ⇒ 4 | Open | 1 ⇒ 7 ⇒ 3 | |
| v-Phase GND Short | Open | 5 ⇒ 6 ⇒ 1 | Close | 4 ⇒ 0 ⇒ 2 | |
| | Close | 1 ⇒ 6 ⇒ 5 | Open | 2 ⇒ 0 ⇒ 4 | |
| v-Phase Instantaneous Interruption | Open | 2 ⇒ 3 ⇒ 4 | Close | 1 ⇒ 7 ⇒ 5 | |
| | Close | 4 ⇒ 3 ⇒ 2 | Open | 5 ⇒ 7 ⇒ 1 | |
| w-Phase GND Short | Open | 3 ⇒ 4 ⇒ 5 | Close | 2 ⇒ 0 ⇒ 6 | |
| | Close | 5 ⇒ 4 ⇒ 3 | Open | 6 ⇒ 0 ⇒ 2 | |
| w-Phase Instantaneous Interruption | Open | 6 ⇒ 1 ⇒ 2 | Close | 5 ⇒ 7 ⇒ 3 | |
| | Close | 2 ⇒ 1 ⇒ 6 | Open | 3 ⇒ 7 ⇒ 5 | |

FIG.10

| Abnormality Occurrence Line/Type | Before Occurrence of Abnormality | After Occurrence of Abnormality | |
|---|---|---|---|
| | Signal Pattern | Signal Pattern | Counter-rotation |
| u-Phase GND Short | 2 ⇒ 2 ⇒ 2 | 2 ⇒ 0 ⇒ 2 | Does not Occur |
| u-Phase Instantaneous Interruption | 5 ⇒ 5 ⇒ 5 | 5 ⇒ 7 ⇒ 5 | |
| v-Phase GND Short | 6 ⇒ 6 ⇒ 6 | 6 ⇒ 0 ⇒ 6 | |
| v-Phase Instantaneous Interruption | 3 ⇒ 3 ⇒ 3 | 3 ⇒ 7 ⇒ 3 | |
| w-Phase GND Short | 4 ⇒ 4 ⇒ 4 | 4 ⇒ 0 ⇒ 4 | |
| w-Phase Instantaneous Interruption | 1 ⇒ 1 ⇒ 1 | 1 ⇒ 7 ⇒ 1 | |

FIG.11

| Abnormality Occurrence Line/Type | Before Occurrence of Abnormality | | After Occurrence of Abnormality | | |
|---|---|---|---|---|---|
| | Operation Direction | Signal Pattern | Operation Direction | Signal Pattern | Counterrotation |
| Transition to u-Phase GND Short | Open | 2⇑3⇑4 | Open | 2⇑0⇑4⇑4 | Does not Occur |
| | Close | 2⇑1⇑6 | Close | 2⇑0⇑6⇑6 | |
| Transition to u-Phase Instantaneous Interruption | Open | 5⇑6⇑1 | Open | 5⇑7⇑1⇑1 | |
| | Close | 5⇑4⇑3 | Close | 5⇑7⇑3⇑3 | |
| Transition to v-Phase GND Short | Open | 6⇑1⇑2 | Open | 6⇑0⇑2⇑2 | |
| | Close | 6⇑5⇑4 | Close | 6⇑0⇑4⇑4 | |
| Transition to v-Phase Instantaneous Interruption | Open | 3⇑4⇑5 | Open | 3⇑7⇑5⇑5 | |
| | Close | 3⇑2⇑1 | Close | 3⇑7⇑1⇑1 | |
| Transition to w-Phase GND Short | Open | 4⇑5⇑6 | Open | 4⇑0⇑6⇑6 | |
| | Close | 4⇑3⇑2 | Close | 4⇑0⇑2⇑2 | |
| Transition to w-Phase Instantaneous Interruption | Open | 1⇑2⇑3 | Open | 1⇑7⇑3⇑3 | |
| | Close | 1⇑6⇑5 | Close | 1⇑7⇑5⇑5 | |
| Recovery from u-phase GND Short | Open | 6⇑1⇑2 | Open | 6⇑6⇑0⇑2 | Does not Occur |
| | Close | 4⇑3⇑2 | Close | 4⇑4⇑0⇑2 | |
| Recovery from u-phase Instantaneous Interruption | Open | 3⇑4⇑5 | Open | 3⇑3⇑7⇑5 | |
| | Close | 1⇑6⇑5 | Close | 1⇑1⇑7⇑5 | |
| Recovery from v-phase GND Short | Open | 4⇑5⇑6 | Open | 4⇑4⇑0⇑6 | |
| | Close | 2⇑1⇑6 | Close | 2⇑2⇑0⇑6 | |
| Recovery from v-phase Instantaneous Interruption | Open | 1⇑2⇑3 | Open | 1⇑1⇑7⇑3 | |
| | Close | 5⇑4⇑3 | Close | 5⇑5⇑7⇑3 | |
| Recovery from w-phase GND Short | Open | 2⇑3⇑4 | Open | 2⇑2⇑0⇑4 | |
| | Close | 6⇑5⇑4 | Close | 6⇑6⇑0⇑4 | |
| Recovery from w-phase Instantaneous Interruption | Open | 5⇑6⇑1 | Open | 5⇑5⇑7⇑1 | |
| | Close | 3⇑2⇑1 | Close | 3⇑3⇑7⇑1 | |

FIG.12

| Abnormality Occurrence Line/Type | Before Occurrence of Abnormality | After Occurrence of Abnormality | |
|---|---|---|---|
| | Signal Pattern | Signal Pattern | Counterrotation |
| u-Phase GND Short | 1 ⇒ 2 ⇒ 1 | 6 ⇒ 0 ⇒ 6 | Does not Occur |
| | 3 ⇒ 2 ⇒ 3 | 4 ⇒ 0 ⇒ 4 | |
| u-Phase Instantaneous Interruption | 4 ⇒ 5 ⇒ 4 | 3 ⇒ 7 ⇒ 3 | |
| | 6 ⇒ 5 ⇒ 6 | 1 ⇒ 7 ⇒ 1 | |
| v-Phase GND Short | 5 ⇒ 6 ⇒ 5 | 4 ⇒ 0 ⇒ 4 | |
| | 1 ⇒ 6 ⇒ 1 | 2 ⇒ 0 ⇒ 2 | |
| v-Phase Instantaneous Interruption | 2 ⇒ 3 ⇒ 2 | 1 ⇒ 7 ⇒ 1 | |
| | 4 ⇒ 3 ⇒ 4 | 5 ⇒ 7 ⇒ 5 | |
| w-Phase GND Short | 3 ⇒ 4 ⇒ 3 | 2 ⇒ 0 ⇒ 2 | |
| | 5 ⇒ 4 ⇒ 5 | 6 ⇒ 0 ⇒ 6 | |
| w-Phase Instantaneous Interruption | 6 ⇒ 1 ⇒ 6 | 5 ⇒ 7 ⇒ 5 | |
| | 2 ⇒ 1 ⇒ 2 | 3 ⇒ 7 ⇒ 3 | |

FIG.13

| Mode | Difference between Pattern Numbers |
|---|---|
| A | -4, -2, +2, +4 |
| B | 0 |
| C | -4, -2, +2, +4 |
| D | 0 |

| Reversal | Difference between Pattern Numbers | Count Correction Value |
|---|---|---|
| To Close Valve Direction in Open Valve Operation | -2 or +4 | +6 count |
| To Open Valve Direction in Close Valve Operation | -4 or +2 | -6 count |

FIG.18
Conventional Art
(a)
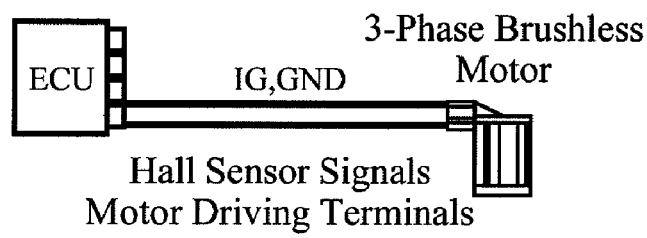
(b)
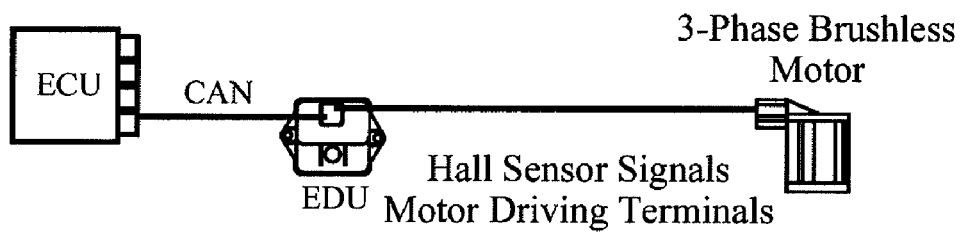
(c)
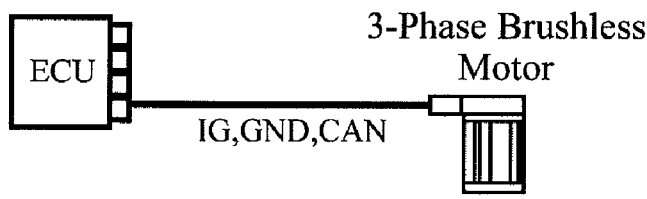

MOTOR CONTROLLER

TECHNICAL FIELD

The present invention relates to a motor controller for controlling driving of a brushless motor.

BACKGROUND ART

A brushless motor is used as a driving source of an actuator for controlling exhaust gas, such as an EGR (Exhaust Gas Recirculation) valve, VG (Variable Geometric) turbo-actuator and the like for a vehicle. FIG. 18 is a diagram showing configurations for controlling driving of a brushless motor. In the configuration shown in FIG. 18(a), an ECU (Engine Control Unit) has a function of directly driving a 3-phase brushless motor and the ECU is connected to the brushless motor via a wire harness (ECU direct drive model). The ECU detects the rotational position of the rotor from output signals of Hall ICs acquired from the brushless motor side via the wire harness, and controls driving of the brushless motor in such a manner that the rotational position of the motor agrees with the target position.

In addition, the configuration of FIG. 18(b) comprises an EDU (Electrical actuator Drive Unit) as a dedicated circuit for driving a 3-phase brushless motor. The EDU is connected to the brushless motor via a wire harness, and to the ECU via a CAN (Controller Area Network) (driving circuit separate model). Hall sensor signals are transmitted from the brushless motor side to the ECU via the wire harness and CAN. The ECU supplies the EDU with a control signal according to the rotational position of the rotor detected from the output signals of the Hall ICs, and the EDU controls driving of the brushless motor in accordance with the control signal from the ECU.

In the configuration of FIG. 18(c), a 3-phase brushless motor has a built-in driving circuit, and the ECU is connected to the driving circuit of the brushless motor via a CAN without via a wire harness (driving circuit integrated model). The ECU receives the output signals of the Hall ICs from the brushless motors via the CAN, detects the rotor rotational position, and controls driving of the brushless motor in such a manner that the rotor comes to a target position.

As for the configurations of the ECU direct drive model and driving circuit separate model, they differ from the driving circuit integrated model in that the output signals of the Hall ICs are transmitted to the ECU via the wire harness. Accordingly, if the wire harness has a short circuit or instantaneous interruption or if noise is superposed on a signal passing through the wire harness, there is a possibility that an abnormality occurs on the output signals of the Hall ICs, and that the rotor of the brushless motor shifts from the target position and the motor makes counterrotation. For example, when using a brushless motor as a driving source of an actuator for controlling an EGR valve, and if the foregoing positional shift or motor counterrotation occurs, there is a risk that the components of the motor and valve may be damaged because of a collision of a motor shaft to a motor stopper (open end or closed end).

As a conventional technique for detecting such an abnormality of a brushless motor, there is an abnormality detecting apparatus disclosed in Patent Document 1. The apparatus stores normal output patterns of a magnetic pole position sensor (Hall ICs, for example), which alter in accordance with the rotation of a brushless motor, and makes a decision of an abnormality if the output pattern of the magnetic pole position sensor actually detected deviates from those stored in advance. More specifically, it handles the output signals of the 3-phase (UVW) magnetic pole position sensor as a binary number with the U phase being the upper position and the W phase being the lowest position, and compares the output patterns of the six values the 3-bit data takes in the normal case with the output pattern obtained from the actual signal.

However, the Patent Document 1 makes the abnormality decision only according to the difference from the output patterns in the normal mode. Accordingly, it has a problem of being unable to make a decision as to whether an instantaneous ground short or open on an output signal line of the sensor is a significant abnormality affecting the driving control of the brushless motor or not. For example, even if the instantaneous ground short or open causes a change in the sensor output patterns, there are some cases where the abnormality recovers immediately from the ground short or open, and the shift of the motor from the target position does not occur. Even in such cases, the Patent Document 1 stops the motor in accordance with the difference from the output patterns in the normal mode.

The present invention is implemented to solve the foregoing problem. Therefore it is an object of the present invention to provide a motor controller capable of detecting an abnormality accurately and quickly which occurs on an output signal line of a position detecting unit for detecting the magnetic pole position of a rotor and which will have significant effect on the driving of a brushless motor. Another object of the present invention is to provide a motor controller capable of detecting counterrotation of the motor due to the abnormality on the signal line, and capable of correcting driving to the normal rotation direction.

Prior Art Document

Patent Document

Patent Document 1: Japanese Patent Laid-Open No. 6-249037/1994.

SUMMARY OF THE INVENTION

A motor controller in accordance with the present invention has a driving control unit of a brushless motor that includes a rotor having magnetic pole position detecting magnets attached thereto and a predetermined number of poles, a stator having multiple phase exciting windings, and position detecting units provided in correspondence to individual phases of the stator for detecting magnetic poles of the magnetic pole position detecting magnets and for outputting detection signals with logic levels corresponding to polarities of the magnetic poles, wherein the driving control unit is connected to output signal lines of the position detecting units of the brushless motor, successively receives output patterns based on the detection signals from the position detecting units via the output signal lines, and rotates the rotor by switching current supply to exciting windings of the individual phases of the stator in response to exciting patterns corresponding to the output patterns, the motor controller comprising: a pattern checking unit for deciding that there is a possibility of a shift of the rotor from a target position and a possibility of counterrotation of the rotor involved with the shift, if an output pattern based on a signal with a prescribed logic level corresponding to a short circuit to or disconnection from ground potential of at least one of the output signal lines is received, and if the output patterns based on the detection signals received before and after the output pattern are found to have different patterns by comparison.

According to the present invention, when it receives the output pattern of the signals with the prescribed logic level corresponding to the short circuit to or disconnection from the ground potential of the output signal line, it compares the output patterns of the detection signals received before and after the reception of the output pattern, and makes a decision, if the two patterns differ, that there is a possibility of causing the shift of the rotor from the target position and the counterrotation of the rotor involved with it. By thus doing, it offers an advantage of being able to detect the abnormality accurately and quickly that occurs on the output signal line of the position detecting units for detecting the magnetic pole position of the rotor and that will have significant effect on the driving control of the brushless motor 1.

BRIEF DESCRIPTION OF THE DRAWINGS

FIG. 5 is a diagram illustrating relationships between current supply directions, Hall IC_Phases and Hall IC outputs during operation of the brushless motor;

FIG. 7 is a block diagram showing a configuration of the control unit in FIG. 4;

FIG. 8 is a diagram showing Hall IC output patterns and pattern numbers assigned to them each;

FIG. 9 is a diagram showing changes in signal patterns in a mode A;

FIG. 10 is a diagram showing changes in signal patterns in a mode B;

FIG. 11 is a diagram showing changes in signal patterns in a mode C;

FIG. 12 is a diagram showing changes in signal patterns in a mode D;

FIG. 13 is a diagram showing differences between pattern numbers of Hall IC output patterns before and after the Hall IC output pattern of a pattern number 0 or 7;

FIG. 18 is a diagram showing configurations for controlling driving of a brushless motor.

DETAILED DESCRIPTION OF THE INVENTION

Embodiments for carrying out the invention will now be described with reference to the accompanying drawings to explain the present invention in more detail.

Embodiment 1

Figure 1:
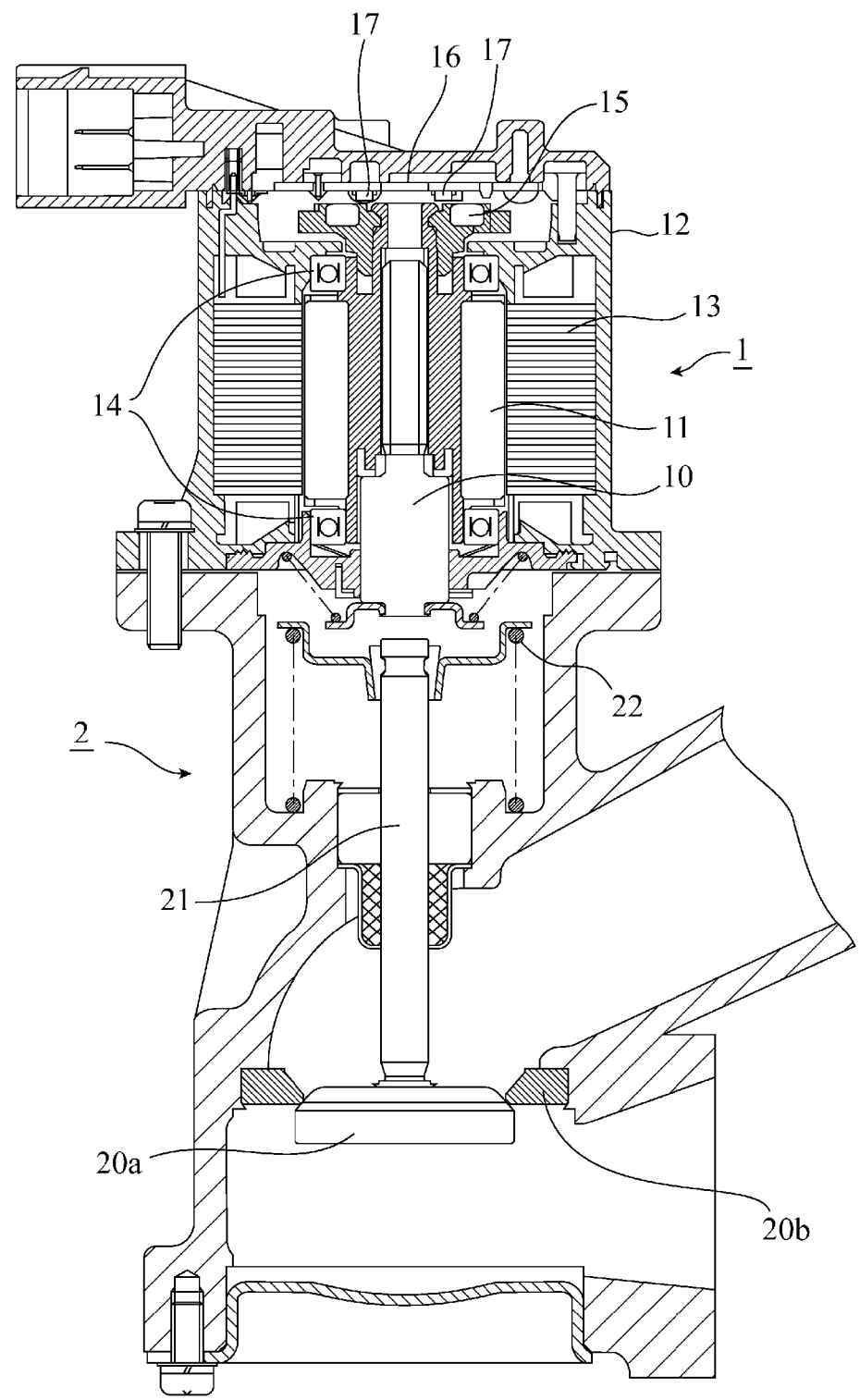
FIG. 1 is a view showing a construction of an EGR valve in which a brushless motor undergoes driving control by the motor controller of an embodiment 1 in accordance with the present invention.

FIG. 1 is a view showing a construction of an EGR valve in which a brushless motor undergoes driving control by the motor controller of an embodiment 1 in accordance with the present invention, which shows an axially cut cross section of the EGR valve. The EGR valve comprises a brushless motor 1 and a valve mechanism 2. The brushless motor 1 comprises a cylindrical rotor 11 which is screwed on a motor shaft 10, is inserted into the hollow of a stator 13 fixed to a case 12, and is rotatably placed on a bearing 14. In addition, a magnetic pole position detecting magnet 15 is fixed in a plane perpendicular to the shaft of the rotor 11.

A printed-circuit board 16 has Hall ICs (position detecting unit) 17 mounted thereon. The Hall ICs 17 constitute a sensor for detecting the rotational position (magnetic pole position) of the rotor 11 and comprise an integrated circuit (IC) including Hall elements. The printed-circuit board 16 is mounted in the case 12 in such a manner that the Hall ICs 17 face the magnetic pole position detecting magnet 15. The motor shaft 10 is movable in its axial direction (vertical direction in FIG. 1) owing to the rotation of the rotor 11.

The valve mechanism 2 has a valve shaft 21 to which a valve disk 20a is fixed, and is placed in such a manner that its axis agrees with the axis of the motor shaft 10. The valve shaft 21 is pulled with a return spring 22 in the direction the valve disk 20a closes. The valve shaft 21 is axially movable owing to the motor shaft 10 that makes contact with its end.

The valve disk 20a is mounted in such a manner as to sit on a valve seat 20b when the motor shaft 10 is pulled toward the brushless motor 1 side, and to separate from the valve seat 20b when the motor shaft 10 is pushed toward the valve mechanism 2 side. By detecting the real opening position of the motor shaft 10 from the rotational position of the rotor 11, the opening and closing state of the valve disk 20b can be acquired.

Figure 2:
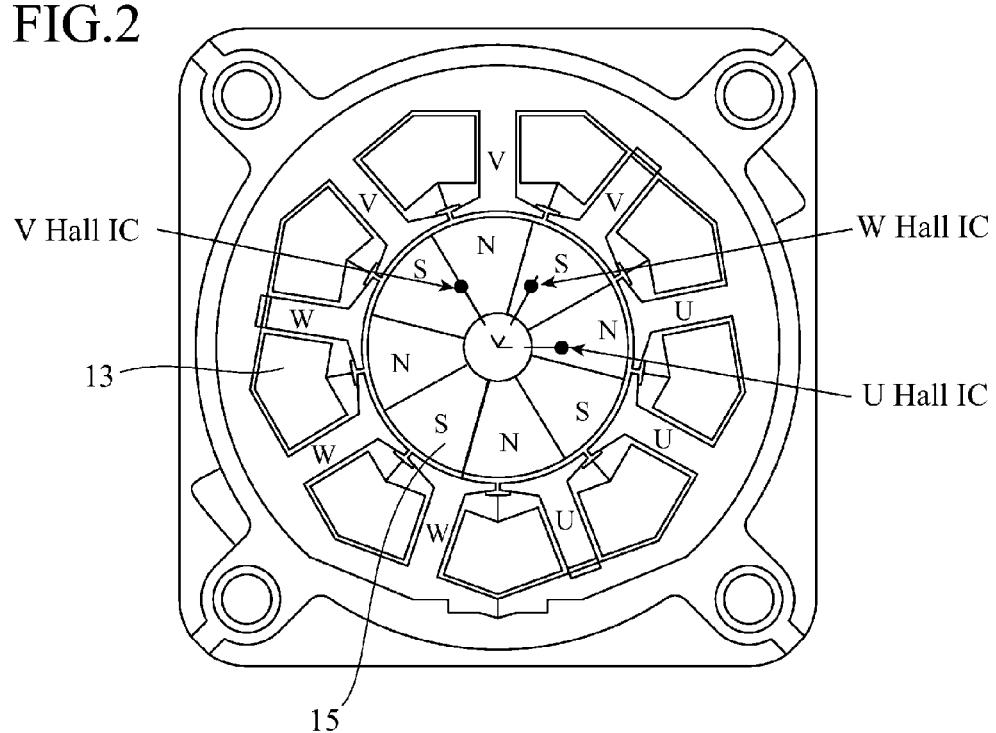
FIG. 2 is a view of the brushless motor seen when looking into a motor shaft end.

FIG. 2 is a view of the brushless motor seen when looking into a motor shaft end, which shows the magnetic pole position detecting magnet 15 with eight poles. In FIG. 2, the number of slots of the stator 13 of the brushless motor 1 is "9" and the number of poles of the rotor 11 is "8". The magnetic pole position detecting magnet 15 is constructed in such a manner that a pair of NS poles correspond to a pole of the rotor 11.

As shown in FIG. 2, the Hall ICs 17 placed facing on the magnetic pole position detecting magnet 15 comprise three Hall ICs: a U Hall IC, a V Hall IC and a W Hall IC.

In the following, the brushless motor 1 in which the number of poles of the rotor 11 equals the number of poles of the magnetic pole position detecting magnet 15 and which has three Hall ICs is referred to as a single precision motor.

Figure 3:
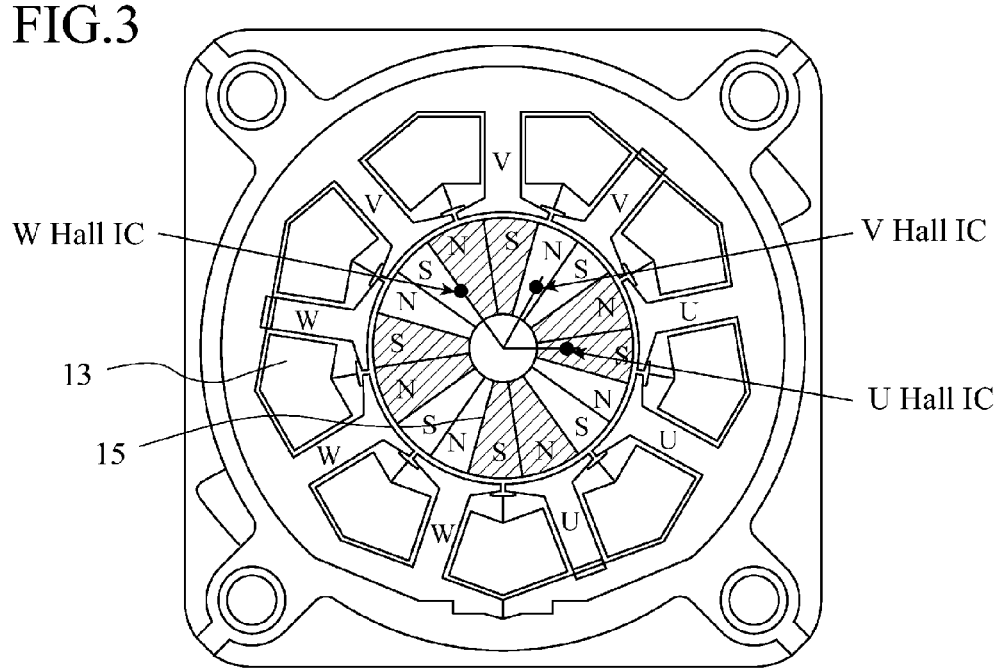
FIG. 3 is a view of the brushless motor with another construction seen when looking into a motor shaft end.

FIG. 3 is a view of the brushless motor with another construction seen when looking into a motor shaft end, which shows the magnetic pole position detecting magnet 15 with 16 poles. The number of slots of the stator 13 of the brushless motor 1 is "9" and the number of poles of the rotor 11 is "8". The magnetic pole position detecting magnet 15 is constructed in such a manner that a pair of NS poles correspond to a pole of the rotor 11. In FIG. 3, a pair of NS poles in a diagonally shaded area corresponds to an N pole of the rotor 11, and a pair of NS poles in an unshaded area corresponds to an S pole of the rotor 11.

In the same manner as in FIG. 2, the Hall ICs 17 placed facing on the magnetic pole position detecting magnet 15 comprise three Hall ICs: a U Hall IC, a V Hall IC and a W Hall IC. Incidentally, the brushless motor 1 having the magnetic pole position detecting magnet 15 with the number of poles twice the number of poles of the rotor 11 and having the three Hall ICs 17 is referred to as a double precision motor. The double precision motor can double the resolution of the rotational position detection of the rotor 11 as compared with that of the single precision motor.

Figure 4:
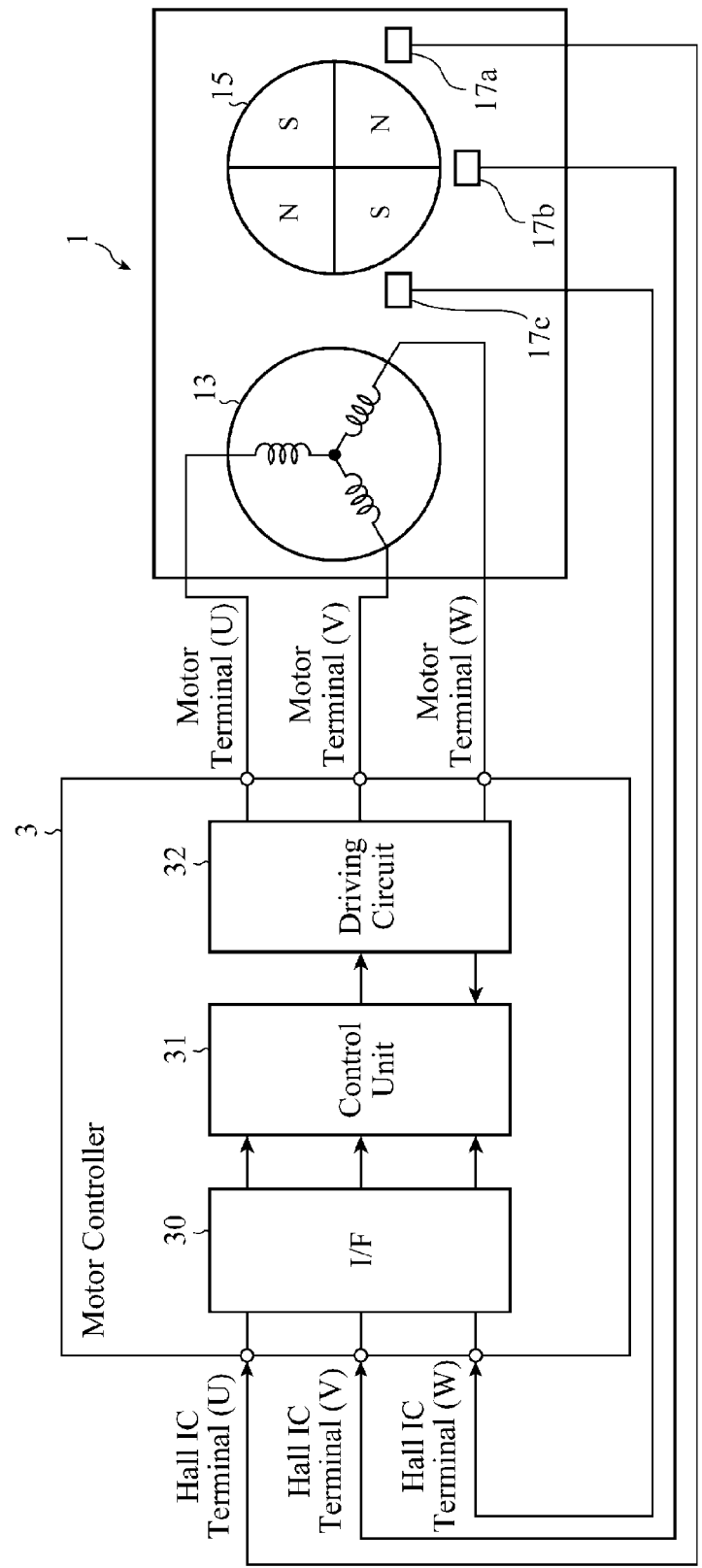
FIG. 4 is a block diagram showing a configuration of the motor controller of the embodiment 1.

FIG. 4 is a block diagram showing a configuration of the motor controller of the embodiment 1 when controlling driving of a double precision motor in which the number of slots of the stator 13 is "3" and the number of poles of the magnetic pole position detecting magnet 15 is "4". The motor controller 3 is mounted in an apparatus such as an ECU or EDU provided separately from the brushless motor 1, and comprises an interface (I/F) 30 with the Hall ICs 17, and a control unit 31 and a driving circuit 32 which function as a driving control unit in accordance with the present invention.

The U Hall IC 17a, V Hall IC 17b and W Hall IC 17c, which are mounted in correspondence to the phases UVW of the stator 13, detect magnetic poles of the magnetic pole position detecting magnet 15, and output detection signals with a logic level corresponding to the polarity of the magnetic poles. The U Hall IC 17a is connected to the Hall IC terminal (U) via the output signal line of the U Hall IC 17a. Likewise, the V Hall IC 17b is connected to the Hall IC terminal (V) via the output signal line of the V Hall IC 17b, and the W Hall IC 17c is connected to the Hall IC terminal (W) via the output signal line of the W Hall IC 17c. The output signal line of the U Hall IC 17a, the output signal line of the V Hall IC 17b and the output signal line of the W Hall IC 17c are put into a wire harness connecting the brushless motor 1 and the motor controller 3.

The interface 30 with the Hall ICs receives the output signal of the U Hall IC 17a via the output signal line and Hall IC terminal (U), performs prescribed amplification processing and the like, and outputs to a control unit 31. Likewise, the interface 30 with the Hall ICs receives the output signal of the V Hall IC 17b via the output signal line and Hall IC terminal (V), performs prescribed amplification processing and the like, and outputs to the control unit 31. Furthermore, the interface 30 with the Hall IC receives the output signal of the W Hall IC 17c via the output signal line and Hall IC terminal (W), performs prescribed amplification processing and the like, and outputs to the control unit 31.

The control unit 31, which is composed of a processing circuit such as a microcomputer, generates a PWM (Pulse Width Modulation) control signal indicating a driving duty ratio according to the output pattern of the Hall ICs 17 acquired from the interface 30, and supplies it to the driving circuit 32. The driving circuit 32 supplies currents to the windings of the stator 13 via the motor terminal (U), motor terminal (V) and motor terminal (W) at a prescribed period corresponding to the PWM control signal. In addition, if a current supplied to a winding of the stator 13 exceeds a prescribed value, the driving circuit 32 makes a decision of an overcurrent, and supplies a driving stop signal to the control unit 31. This will prevent the control unit 31 from generating the PWM control signal.

FIG. 5 is a diagram showing the correspondence of the current supply directions to the Hall IC_Phases (called "Hall IC phases" from now on) and the Hall IC outputs during operation of the brushless motor. It shows a case where the brushless motor 1 is used as the driving source of the EGR valve shown in FIG. 1, and its driving is controlled by the motor controller 3 shown in FIG. 4.

In addition, FIG. 5(a) shows the correspondence of the current supply directions to the Hall IC phases and the Hall IC outputs during operation of the single precision brushless motor shown in FIG. 2. FIG. 5(b) shows the correspondence of the current supply directions to the Hall IC phases and the Hall IC outputs during operation of the double precision brushless motor shown in FIG. 3. Incidentally, the Hall IC phases correspond to the pattern numbers which will be described with reference to FIG. 8. In addition, a switching sequence of the motor exciting patterns corresponding to the Hall IC output patterns specified by the Hall IC phases is referred to as a motor count (motor current supply number).

In FIG. 5(a), when rotating the rotor 11 in the direction of opening the valve disk 20a (referred to as "open valve driving" from now on), the current supply is repeated in the sequence of V→U, W→U, W→V, U→V, U→W, V→W for the U phase, V phase and W phase windings of the stator 13 as indicated by an arrow in FIG. 5(a). By thus switching the motor exciting patterns with the motor counts 1-6 in ascending order, the single precision brushless motor 1 carries out the open valve driving.

On the other hand, when rotating the rotor 11 in the direction of closing the valve disk 20a (referred to as "close valve driving" from now on), the current supply is repeated in the sequence of W→V, W→U, V→U, V→W, U→W, U→V for the U phase, V phase and W phase windings of the stator 13 as indicated by an arrow in FIG. 5(a). By thus switching the motor exciting patterns with the motor counts 1-6 in descending order, the single precision brushless motor 1 carries out the close valve driving.

As for the brushless motor 1 of FIG. 5(b), since the number of poles of the magnetic pole position detecting magnet 15 is 16, even when the output patterns of the Hall ICs 17 complete a circle, the amount of movement due to the motor exciting patterns is half that of FIG. 5(a). Accordingly, for each single current supply direction, there are two types of the output patterns of the Hall ICs 17. More specifically, the Hall ICs 17 produce the same output patterns in an A region of the motor exciting pattern, in which the current supply direction in the open valve driving is V→U, W→U and W→V and the current supply direction in the close valve driving is V→W, U→W and U→V, and in a B region of the motor exciting pattern, in which the current supply direction in the open valve driving is U→V, U→W and V→W and the current supply direction in the close valve driving is W→V, W→U and V→U.

In addition, as indicated by arrows in FIG. 5(b), by switching the motor exciting patterns with the motor counts 1-12 in ascending order, the double precision brushless motor 1 carries out the open valve driving, and by switching the motor exciting patterns with the motor counts 1-12 in descending order, the double precision brushless motor 1 carries out close valve driving.

Here, a process of causing a counterrotation of the double precision brushless motor 1 owing to an abnormality (ground short or instantaneous interruption) occurring on an output signal line of the Hall ICs 17 will be described in detail.

Figure 6:
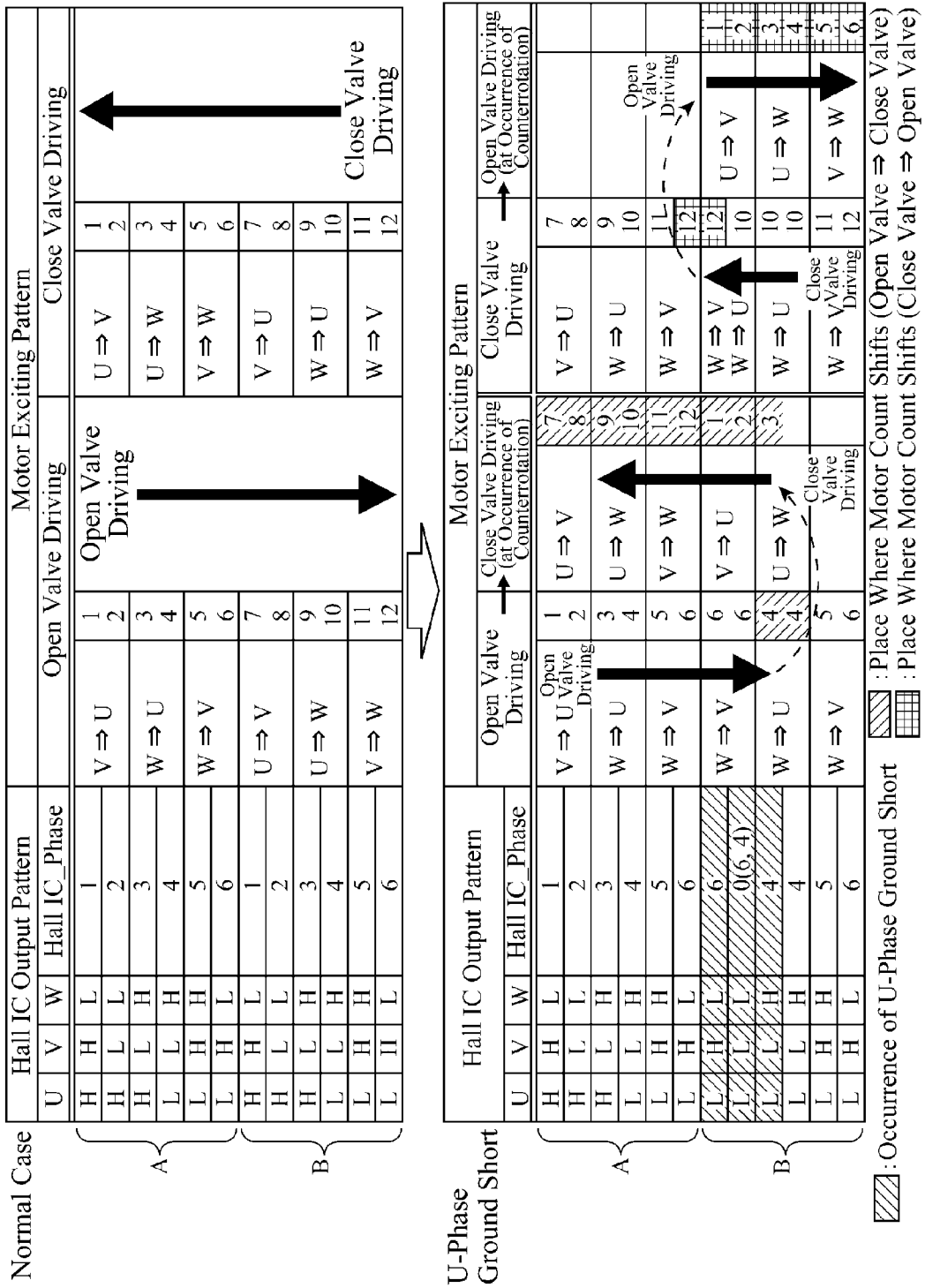
FIG. 6 is a diagram illustrating a process of counterrotation of a double precision brushless motor.

FIG. 6 is a diagram illustrating the process of the counterrotation of the double precision brushless motor. In FIG. 6, in a normal mode, the output patterns of the Hall ICs 17 are the same in the A region and B region of the motor exciting pattern as shown in FIG. 5(b). Here, an example will be given in which a ground short occurs on the output signal line of the U Hall IC 17a in a region denoted by forward slashes in the B region of the motor exciting pattern, and the logic level of the output signal of the U Hall IC 17a becomes L level.

In this case, the logic levels of the output signals of the U Hall IC 17a, V Hall IC 17b and W Hall IC 17c, which should make a transition from HHL to HLL and then to HLH normally, make a transition from LHL to LLL and then to LLH.

As for the Hall IC phase, it changes from "1" corresponding to the normal HHL to "6" corresponding to LHL after the occurrence of the abnormality. As for the next Hall IC phase, which should be "2" normally, since the Hall IC output pattern becomes LLL, the Hall IC phase becomes "0". After that, the Hall IC phase, which should be "3" normally, changes to "4" corresponding to LLH after the occurrence of the abnormality.

If the trouble occurs during the open valve driving, since the Hall IC phase just after switching from the A region to B region is "6" as shown by the region denoted by forward slashes in FIG. 6, the U phase, V phase and W phase windings of the stator 13 are supplied with the currents according to the motor exciting pattern (motor count "6") corresponding to that. Thus, the current supply in the direction W→V continues instead of the normal current supply in the direction U→V. After that, according to the change to the Hall IC output pattern LLH corresponding to the Hall IC phase "4" because of the occurrence of the abnormality, the motor count shifts to "4" in accordance with that, and the current supply in the direction W→U based on the motor exciting pattern with the motor count "4" is carried out. In this way, the motor count is shifted by −6 counts from the normal "10" to "4".

In this way, if the current supply is carried out in the direction W→U which appears in the A region in the open valve driving, although the motor exciting pattern belongs to the B region normally, there is a possibility of making a decision that it belongs to the A region. In this case, if the current supply is made in the direction U→W, which is the motor exciting pattern corresponding to the Hall IC phase "4" due to the motor count shift among the motor exciting patterns occurring in the A region in the close valve driving, then as shown by regions denoted by backward slashes in FIG. 6, the current supply is successively performed in the motor exciting patterns in the close valve driving, and the brushless motor 1 makes a counterrotation, thereby carrying out close valve driving.

On the other hand, if the foregoing trouble occurs during the close valve driving, since the Hall IC phase is "6" just after switching from the B region to the A region, the current supply in the direction W→V is continued which is the motor exciting pattern with the motor count "12" corresponding to the Hall IC phase "6" as indicated by portions denoted check patterns in FIG. 6. In this way, the motor count is shifted by +6 counts from the normal "6" to "12".

In this way, if the current supply is carried out in the direction W→V which appears in the B region in the close valve driving, although the motor exciting pattern belongs to the A region normally, there is a possibility of making a decision that it belongs to the B region. In this case, if the current supply is made in the direction W→V, which is the motor exciting pattern corresponding to the Hall IC phase "6" due to the motor count shift among the motor exciting patterns occurring in the A region in the open valve driving, then as shown by regions denoted by check patterns in FIG. 6, the current supply is successively performed in the motor exciting patterns in the open valve driving, and the brushless motor 1 makes a counterrotation, thereby carrying out open valve driving.

To prevent the count shift of the motor count due to the above-mentioned ground short or instantaneous interruption (instantaneous open) on an output signal line of the Hall ICs 17, the control unit 31 has a functional block as shown in FIG. 7. In FIG. 7, the control unit 31 comprises a first detecting unit 4a, a second detecting unit 4b, an AND circuit 45, and an OR circuit 46. The first detecting unit 4a is a component for detecting an abnormality having a possibility of causing the positional shift of the rotor 11 and the counterrotation of the brushless motor 1 involved with it from a shift of the Hall IC output pattern due to the ground short or instantaneous interruption occurring on the output signal line of the Hall ICs 17, and comprises a pattern checking unit 40 and a timer (timer output unit) 41.

The pattern checking unit 40 is a component that acquires the Hall IC output patterns from the Hall ICs 17 via the interface 30, and that decides, when an output pattern due to signals with prescribed logic levels (LLL or HHH which will be described later with reference to FIG. 8) corresponding to a ground short or instantaneous interruption of an output signal line of the Hall ICs 17, the possibility of causing the positional shift of the rotor 11 and the counterrotation of the brushless motor 1 involved with it depending on whether the Hall IC output patterns before and after the point of acquisition are the same or not.

The timer 41 is a component that starts counting from the moment of the abnormality decision by the pattern checking unit 40, and outputs a signal with a prescribed logic level (H level) indicating the abnormality decision during the count width. The output signal of the timer 41 is referred to as an output B. Incidentally, the reason for continuing to inform abnormality detection throughout the prescribed count width by the timer 41 is to compensate for a time lag between the ground short or instantaneous interruption occurring on the output signal line of the Hall ICs 17 and its appearance in the Hall IC output pattern.

The second detecting unit 4b is a component that compares, when driving the brushless motor 1 following a target waveform, the integral value of the driving duty ratio and the position velocity with prescribed first threshold and second threshold, respectively, and outputs signals with a prescribed logic level indicating a decision result of the counterrotation in accordance with the compared result, and that comprises an integrating unit 42 and comparing units 43a and 43b. Incidentally, the term "target waveform" refers to a waveform shaped from each target position when varying the target position of the rotational position of the rotor 11 stepwise in terms of time. In addition, the term "position velocity" is the velocity at which the actual position of the rotor 11 varies following the target waveform.

The integrating unit 42 is a component for acquiring the driving duty ratio and the position velocity successively obtained by the motor driving control following the target waveform, and for integrating them. The comparing unit (first comparing-deciding unit, comparing-deciding unit) 43a is a component for successively acquiring the integral value of the driving duty ratio and the position velocity calculated by the integrating unit 42, and for outputting a signal with a prescribed logic level (H level) when the integral value satisfies a prescribed required condition using the first threshold. The output signal of the comparing unit 43a is referred to as an output A.

In addition, the comparing unit (second comparing-deciding unit, comparing-deciding unit) 43b is a component for successively acquiring the integral value of the driving duty ratio and the position velocity calculated by the integrating unit 42 in the same manner as the comparing unit 43a, and for outputting a signal with a prescribed logic level (H level) when the integral value satisfies a prescribed required condition using the second threshold. The output signal of the comparing unit 43b is referred to as an output C.

As for the required condition of the comparing unit 43a or 43b, when the integral value is less than the threshold by a predetermined number of consecutive times, a decision is made that the condition is satisfied. Incidentally, the comparing unit 43b decides the second threshold and the predetermined number in such a manner that the required condition becomes severer than that of the comparing unit 43a. In other words, the second threshold is set at a value less than the first threshold, and the predetermined number of the comparing unit 43*b* is set at a value greater than the predetermined number of the comparing unit 43*a*.

The AND circuit (AND) 45 is a component for carrying out an AND operation between the output B of the timer 41 and the output A of the comparing unit 43*a*, and its output is supplied to the OR circuit 46. The OR circuit (OR) 46 is a component for carrying out an OR operation between the output of the AND circuit 45 and the output C of the comparing unit 43*b*. Its output D becomes a detection result of the counterrotation of the brushless motor 1.

FIG. 8 is a diagram showing the Hall IC output patterns and the pattern numbers assigned to them, respectively. Using the pattern number assigned to each Hall IC output pattern as shown in FIG. 8, the pattern checking unit 40 monitors the Hall IC output patterns acquired via the interface 30. Here, the Hall IC output patterns with the pattern numbers 1-6 are a combination of the phases UVW including one L level or H level or two L levels or H levels.

If a ground short occurs on an output signal line on which the Hall ICs 17 output the H level in the Hall IC output patterns with a single H level (pattern number 2, 4 or 6), the output pattern will become LLL. The pattern is referred to as a pattern number 0. In contrast, if an instantaneous interruption occurs on the output signal line on which the Hall ICs 17 output the L level in the Hall IC output patterns with a single L level (pattern number 1, 3 or 5), the output pattern will become HHH. The pattern is referred to as a pattern number 7.

Even if the output signal line of the Hall IC has a ground short or instantaneous interruption, unless the Hall IC output pattern changes before and after the ground short or instantaneous interruption, the position count value (motor count value) is unaffected. In contrast, if the Hall IC output pattern changes before and after the ground short or instantaneous interruption, there is a possibility of causing a positional shift of the rotor 11 and counterrotation of the brushless motor 1 involved with it.

Thus, if an abnormality occurs in the Hall IC output pattern and if the Hall IC output patterns before and after the input of the Hall IC output pattern with the pattern number 0 or 7 differ, the pattern checking unit 40 makes a decision that there is a possibility of bringing about the positional shift of the rotor 11 from the target position and the counterrotation of the brushless motor 1 involved with it. In contrast, if they are the same, it makes a decision that there is not any problem in the driving control.

Next, the operation will be described.
(1) First Abnormality Detection (Detection of State in Which Motor Counterrotation Can Occur)

The motor controller 3 of an embodiment 1 detects as an abnormality a state in which there is a possibility of bringing about the positional shift and the motor counterrotation involved with it owing to a ground short or instantaneous interruption occurring on an output signal line of the Hall ICs (first abnormality detection). The processing is executed by the first detecting unit 4*a* shown in FIG. 7.

If the ground short or instantaneous interruption occurs on one of the output signal lines of the U Hall IC 17*a*, V Hall IC 17*b* and W Hall IC 17*c*, the following four modes A-D can occur as a pattern according to which the Hall IC output pattern switches to the LLL with the pattern number 0 or to the HHH with the pattern number 7.

The mode A refers to the case where in the state in which the ground short or instantaneous interruption occurring on the output signal line of the Hall ICs 17 causes the abnormality of the logic level of the output signal to be received from the output signal line, the windings of the three phases UVW of the stator 13 are supplied with currents, and the rotor 11 rotates and passes by the individual exciting windings of the stator 13.

The mode B refers to the case where the output signal line of the Hall ICs has the ground short or instantaneous interruption occurring thereon, but recovers from the ground short or instantaneous interruption earlier than the phase switching due to the rotation of the rotor 11.

The mode C refers to the case where the output signal line of the Hall ICs has the ground short or instantaneous interruption occurring thereon in a condition corresponding to the mode A, or recovers from the ground short or instantaneous interruption in the condition corresponding to the mode A.

The mode D refers to the case where the rotor 11 moves back and forth between the Hall IC output pattern with the pattern number 0 or 7 and the Hall IC output pattern with its adjacent phase.

FIG. 9 is a diagram showing changes in the signal patterns in the mode A. As shown in FIG. 9, the signal patterns show transitions of the Hall IC output patterns in terms of the pattern numbers of the Hall IC output patterns. For example, as for the signal patterns 1→2→3 in the open valve driving before an abnormality, they change such as HHL→HLL→HLH in which the Hall IC output patterns are arranged in the count-up order of the motor count.

If the output signal line of the U Hall IC 17*a* of the U phase has an instantaneous ground short, they change to the signal patterns after the abnormality 6→0→4 (LHL→LLL→LLH in terms of the Hall IC output patterns). In this case, the operation becomes close valve driving and the brushless motor 1 makes counterrotation.

FIG. 10 is a diagram showing changes in the signal patterns in the mode B. In the same manner as in FIG. 9, the Hall IC output patterns are replaced by the pattern numbers. In the mode B, the recovery from the ground short or instantaneous interruption is made earlier than the phase switching due to the rotation of the rotor 11.

For example, in the signal patterns 2→2→2 before the switching of the Hall IC output pattern, if the output signal line of the U Hall IC 17*a* has a ground short and recovers instantaneously, the Hall IC output pattern does not change as a result. Accordingly, the positional shift of the rotor 11 from the target position does not occur, and the motor counterrotation does not occur consequentially.

FIG. 11 is a diagram showing changes in the signal patterns in the mode C. In the same manner as in FIG. 9, the Hall IC output patterns are replaced by the pattern numbers. As the mode C, there is such a case in which even if the output signal line of the Hall ICs has the ground short or instantaneous interruption occurring thereon in the condition corresponding to the mode A, it returns to the original Hall IC output pattern.

For example, if the output signal line of the U Hall IC 17*a* has the ground short occurring thereon in the pattern number 2 and on in the signal pattern 2→3→4 in the open valve driving, the Hall IC output pattern HLL corresponding to the pattern number 2 will change to LLL of the pattern number 0 as shown in FIG. 11.

Subsequently, although the Hall IC output pattern HLH of the pattern number 3 becomes LLH of the pattern number 4, the next Hall IC output pattern LLH of the pattern number 4 remains intact because the logic level of the output signal of the U Hall IC 17*a* is L level originally. As a result, the final Hall IC output pattern in the signal pattern is not changed so that the counterrotation due to the positional shift of the rotor 11 from the target position does not occur.

In addition, as an example of another signal pattern change in the mode C, there is such a case in which the output signal line of the Hall ICs has the ground short or instantaneous interruption occurring thereon in the condition corresponding to the mode A, and recovers immediately.

For example, consider the case where the output signal line of the U Hall IC 17a has the ground short occurring thereon at the pattern number 6 and on in the signal pattern 6→1→2 in the open valve driving. In this case, although the Hall IC output pattern LHL of the pattern number 6 remains intact as shown in FIG. 11, the Hall IC output pattern HHL of the pattern number 1 becomes LHL of the pattern number 6.

Subsequently, after the Hall IC output pattern HLL of the pattern number 2 becomes LLL of the pattern number 0, the output signal line of the U Hall IC 17a recovers from the ground short earlier than the phase switching due to the rotation of the rotor 11. Thus, the Hall IC output pattern returns from the LLL of the pattern number 0 to the HLL of the pattern number 2. As a result, the final Hall IC output pattern in the signal pattern is not changed, and the counterrotation due to the positional shift of the rotor 11 from the target position does not occur.

FIG. 12 is a diagram showing changes in the signal patterns in the mode D. In the same manner as in FIG. 9, the Hall IC output patterns are replaced by the pattern numbers. In the mode D, such an operation is supposed in which the rotor 11 moves back and forth to and from the position of a particular Hall IC output pattern via the position of the Hall IC output pattern adjacent to its phase. For example, there is such a signal pattern 1→2→1 shown in FIG. 12.

If the output signal line of the U Hall IC 17a has the ground short occurring thereon in the signal pattern 1→2→1, the Hall IC output pattern HHL corresponding to the pattern number 1 will become LHL of the pattern number 6. Subsequently, after the Hall IC output pattern HLL of the pattern number 2 becomes LLL of the pattern number 0, the Hall IC output pattern HHL becomes LHL of the pattern number 6. In the mode D, since the Hall IC output patterns before and after the input of the Hall IC output pattern of the pattern number 0 or 7 are the same, the counterrotation due to the positional shift of the rotor 11 from the target position does not occur.

As described above, even if the output signal line of the Hall ICs has the ground short or instantaneous interruption occurring thereon, the positional shift of the rotor 11 that will cause the counterrotation of brushless motor 1 does not occur in the mode B or D in which the Hall IC output patterns before and after receiving the LLL of the pattern number 0 or the HHH of the pattern number 7 are the same.

Accordingly, the pattern checking unit 40 of the first detecting unit 4a monitors the Hall IC output pattern LLL (pattern number 0) or the Hall IC output pattern HHH (pattern number 7) among the Hall IC output patterns acquired from the Hall ICs 17, and makes a decision as to whether the Hall IC output patterns before and after the input of the Hall IC output pattern LLL or HHH detected are the same or not.

For example, as shown in FIG. 13, the pattern checking unit 40 obtains a difference by subtracting from the pattern number of the Hall IC output pattern before receiving the LLL (pattern number 0) or HHH (pattern number 7) the pattern number of the Hall IC output pattern after receiving the LLL or HHH. Unless the difference is zero (mode A or C), the pattern checking unit 40 makes a decision that there is a possibility of causing the counterrotation of the rotor 11 due to the positional shift and notifies the timer 41 of the abnormality decision. The timer 41 starts counting from the moment of the abnormality decision by the pattern checking unit 40 and outputs an H level signal during the count width.

(2) Second Abnormality Detection (Detection of Motor Counterrotation)

As long as the brushless motor 1 is driven following a target waveform, the value obtained by integrating the driving duty ratio and position velocity is positive. However, if the brushless motor 1 makes counterrotation, the product of the driving duty ratio and the position velocity becomes negative. For example, if the brushless motor 1 makes counterrotation while the open valve command is being issued, although the driving duty ratio is positive, the position velocity, the velocity at which the actual position of the rotor 11 changes, becomes negative.

Accordingly, the motor controller 3 of the embodiment 1 makes a decision of the presence or absence of the motor counterrotation using a compared result of the integral value with a prescribed threshold in addition to the first abnormality detection result (second abnormality detection).

Figure 14:
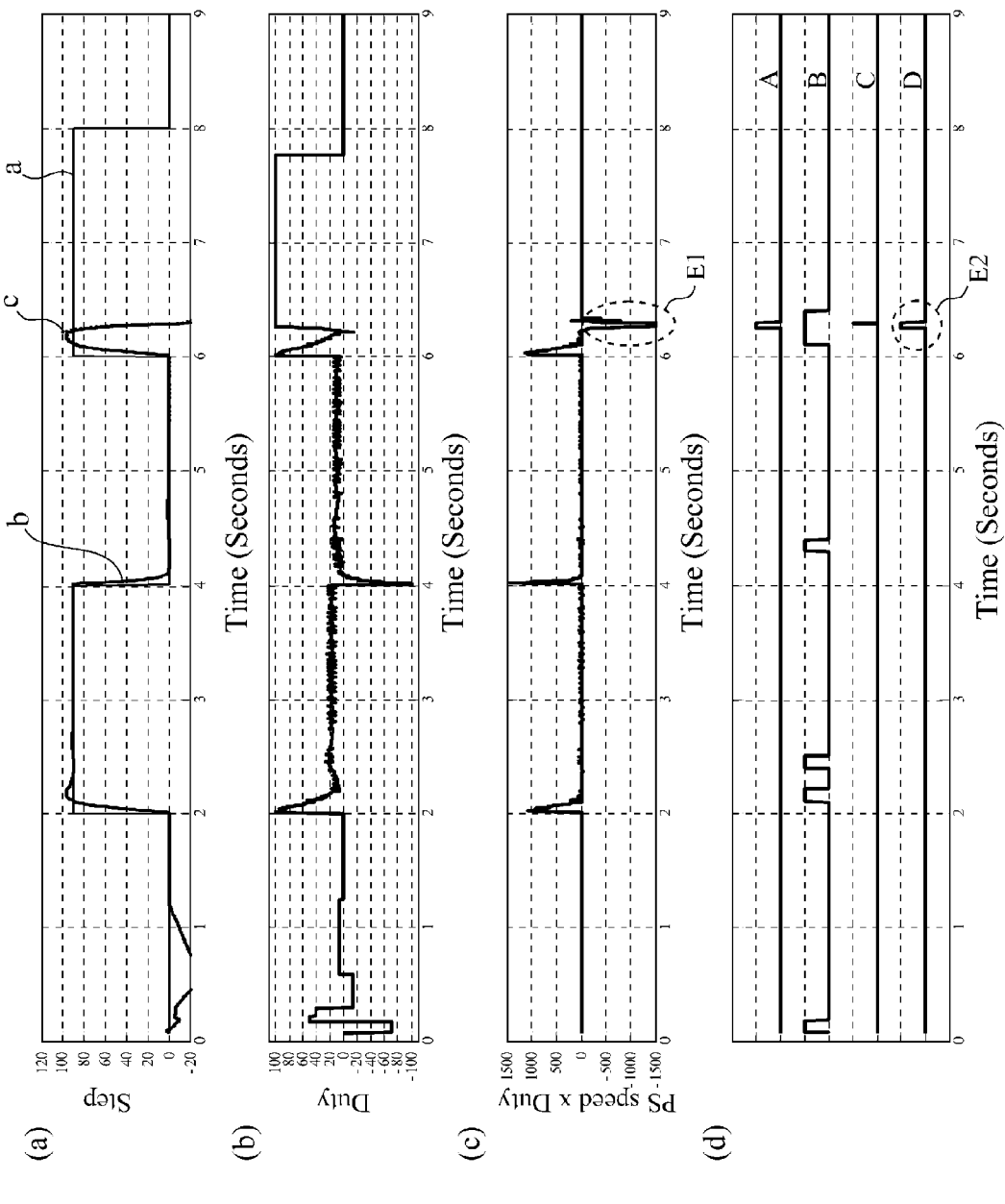
FIG. 14 is a diagram showing a process up to detecting motor counterrotation.

FIG. 14 is a diagram illustrating a process up to detecting the motor counterrotation, which shows a case of using the double precision brushless motor 1 as the driving source of the EGR valve shown in FIG. 1 and of controlling its driving by the control unit 31 shown in FIG. 7. As a control content, it controls the rotational position of the rotor 11 in such a manner as to follow a square target waveform (waveform designated by a symbol a in FIG. 14(*a*)) that repeats the driving start position and the 90 step forward position at every two second interval as shown in FIG. 14(*a*). The waveform designated by a symbol b is the number of steps indicating the opening of the EGR valve corresponding to the rotational position of the rotor 11, which follows the waveform of the actual position of the rotor 11 designated by a symbol c.

FIG. 14 shows an example in which a ground short or instantaneous interruption occurs on one of the output signal lines of the Hall ICs a little over six seconds from starting the driving control, and the brushless motor 1 makes counterrotation owing to the positional shift of the rotor 11. In this case, as shown in FIG. 14(*a*), the waveform c indicating the actual position of the rotor 11 deviates greatly from the target waveform a at a portion a little over the six seconds.

In addition, the integrating unit 42 of the second detecting unit 4b successively receives the driving duty ratio (Duty) shown in FIG. 14(*b*) and the position velocity (PS speed) of the changes of the actual position of the rotor 11, and integrates them. FIG. 14(*c*) shows the result. Incidentally, as clearly seen from the portion designated by the symbol E1 in FIG. 14(*c*), the integral value of the driving duty ratio and the position velocity becomes negative because of the counterrotation of the brushless motor 1.

The comparing unit 43a, successively receiving the integral values of the driving duty ratios and the position velocity calculated by the integrating unit 42 as described above, outputs an H level signal (output A) if a required condition that the integral values are less than the first threshold by a predetermined number of consecutive times. Likewise, the comparing unit 43b, successively receiving the integral values of the driving duty ratios and the position velocity calculated by the integrating unit 42, outputs an H level signal (output C) if a required condition that the integral values are less than the second threshold by a predetermined number of consecutive times.

Incidentally, as for the required condition for the comparing unit 43a, a decision is made that it is achieved when the integral value is less than the first threshold which is set at −300, for example, two consecutive points. Likewise, as for the required condition for the comparing unit 43b, a decision is made that it is achieved when the integral value is less than the second threshold which is set at −600, for example, eight consecutive points so that the required condition becomes severer than that for the comparing unit 43a. In this way, the comparing units 43a and 43b are provided with their own thresholds, and the reason for making the required condition for the comparing unit 43b severer than that for the comparing unit 43a will be described later with reference to FIG. 15.

As for the possibility that the counterrotation due to the positional shift of the rotor 11 can occur, the first detecting unit 4a makes an abnormality decision, and the timer 41 outputs the H level signal (output B) indicating that the abnormality decision is made during the count width. Thus, the outputs A-C have signal waveforms as shown in FIG. 14(d). Here, the abnormality decision is notified during the count width by the timer 41. Thus, the H level signal output indicating the abnormality decision is maintained during a period (part designated by the symbol E1) including the time in which the motor actually makes the counterrotation from the time at which the pattern checking unit 40 makes the abnormality decision.

The final decision as to the motor counterrotation is made according to the value of the output D. Here, since the outputs A and B are H level, the AND circuit 45 outputs an H level signal. In addition, since the output C and the output of the AND circuit 45 are H level, the OR circuit 46 outputs an H level value. Thus, a decision is made that the brushless motor 1 makes counterrotation because the logic level of the output D becomes H level as denoted by the symbol E2 in FIG. 14(d).

Figure 15:
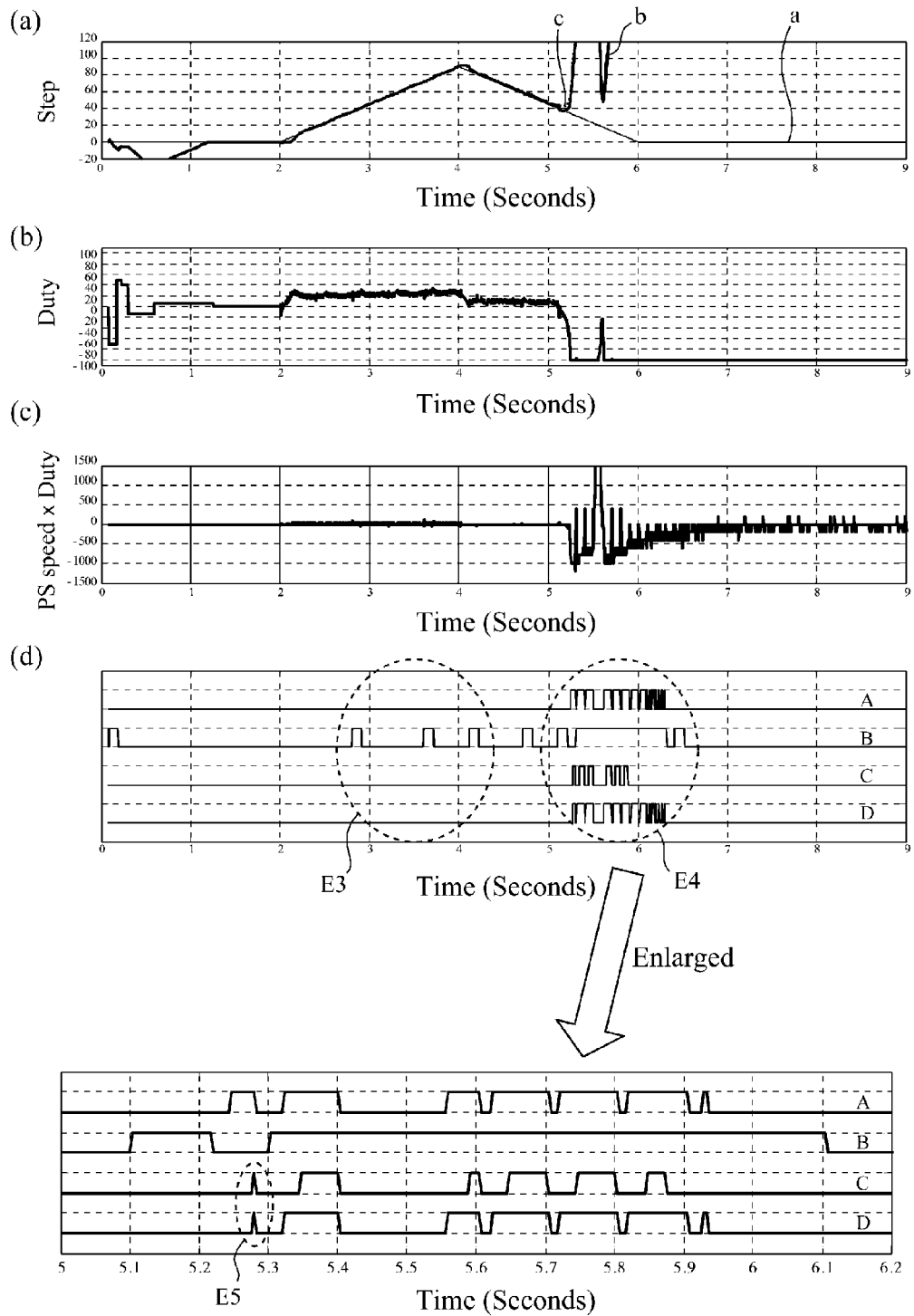
FIG. 15 is a diagram showing a process up to detecting motor counterrotation.

FIG. 15 is a diagram showing a process up to the detection of the motor counterrotation in another control content. As FIG. 14, it shows a case where the double precision brushless motor 1 is used as the driving source of the EGR valve shown in FIG. 1 and the control unit 31 shown in FIG. 7 controls the driving. As the control content, it controls the rotational position of the rotor 11 in such a manner that it follows a target waveform a with a ramp waveform repeating a 90 step forward position as shown in FIG. 15(a). In addition, the waveform designated by the symbol b represents the number of steps indicating the opening of the EGR valve corresponding to the rotational position of the rotor 11, which follows the waveform of the actual position of the rotor 11 designated by the symbol c.

FIG. 15 shows an example in which the output signal line of the Hall ICs has the ground short occurring thereon for a short period (0.1 second, for example) intermittently after a little over five seconds from starting the driving control, which brings about the positional shift of the rotor 11, thereby causing counterrotation of the brushless motor 1. In this case, as shown in FIG. 15(a), the waveform c representing the actual position of the rotor 11 deviates greatly from the target waveform a after a little over the five seconds.

FIG. 15(c) shows a result of successively integrating the driving duty ratio (Duty) shown in FIG. 15(b) and the position velocity (PS speed) of the actual position change of the rotor 11. As shown in FIG. 15(c), the integral value with a negative value occurs frequently after a little over the five seconds.

The comparing unit 43a, successively receiving the integral values of the driving duty ratio and the position velocity calculated by the integrating unit 42, outputs the H level signal (output A) if the required condition that the integral values are less than the first threshold by the predetermined number of consecutive times. Likewise, the comparing unit 43b, successively receiving the integral values of the driving duty ratios and the position velocity calculated by the integrating unit 42, outputs the H level signal (output C) if the required condition that the integral values are less than the second threshold by the predetermined number of consecutive times.

Here, since the negative integral values occur frequently after a little over the five seconds from starting the driving control, the outputs A-C have a signal waveform as shown in FIG. 15(d). The timer 41 outputs the H level value during the count width in the region denoted by the symbol E3 from the moment of the abnormality decision by the pattern checking unit 40. However, it outputs the H level signal for a long time as shown in the enlarged drawing of the portion denoted by the symbol E4 if the logic of the abnormality decision occurs intermittently. This trend becomes more conspicuous as the count width of the timer 41 becomes greater.

Considering this, in the present invention, the required condition for the comparing unit 43b is made severer than that for the comparing unit 43a, and the OR operation having the output C of the comparing unit 43b as its input is made the decision result D of the final motor counterrotation. This makes it possible to detect the motor counterrotation at once at the time when abnormal behavior (a case in which large negative integral values are obtained consecutively) occurs which will enable making a clear-cut decision that the motor counterrotation will take place without increasing the count width of the timer 41. For example, in the enlarged drawing of E4, a decision is made that the brushless motor 1 makes the counterrotation at the time when the output C of the comparing unit 43b becomes H level (see a portion denoted by the symbol E5) before the output A becomes H level.

(3) Correction of Motor Counterrotation.

Figures 16, 17:
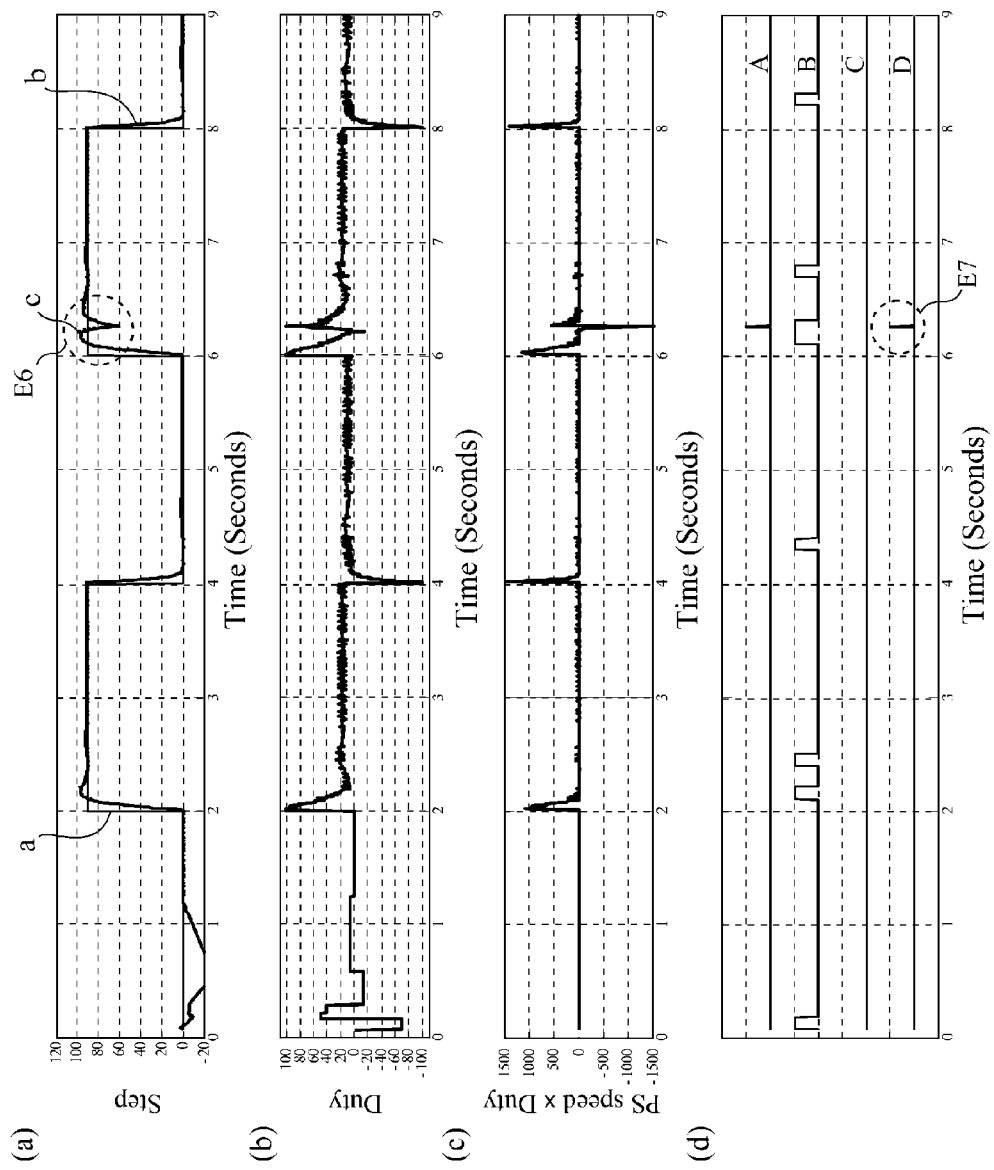
FIG. 16 is a diagram showing differences between pattern numbers and count correction values.
FIG. 17 is a diagram showing a process for correcting motor counterrotation.

As described above, the first detecting unit 4a detects changes in signal patterns in the mode A or C as the abnormality with a possibility of causing the counterrotation due to the positional shift of the rotor 11. As shown in FIG. 16, as for the changes in the signal patterns in the mode A or C when controlling driving of the double precision motor, the difference between the pattern numbers corresponding to the Hall IC output patterns before and after the Hall IC output pattern of the pattern number 0 or 7 becomes −2 or +4 when making counterrotation in the close valve direction at the open valve driving, and becomes −4 or +2 when making counterrotation in the open valve direction at the close valve driving.

That the difference between the pattern numbers is −2 or +4 at the counterrotation in the close valve direction at the open valve driving of the double precision motor corresponds to the case where the motor count shifts by the amount of −6 counts as shown in FIG. 6 described above. Likewise, that the difference between the pattern numbers is −4 or +2 at the counterrotation in the open valve direction at the close valve driving of the double precision motor corresponds to the case where the motor count shown in FIG. 6 shifts by the amount of +6 counts.

Accordingly, if the first detecting unit 4a and second detecting unit 4b detect the motor counterrotation, the control unit 31 adds the count correction value shown in FIG. 16 to the motor count value at that point of time. Thus, in the case of counterrotation in the close valve direction at the open valve driving, it adds +6 counts to the motor count value as the count correction value. Likewise, in the case of counterrotation in the open valve direction at the close valve driving, it adds −6 counts to the motor count value as the count correction value.

In the example shown in FIG. 6, at the counterrotation in the close valve direction at the open valve driving, the control unit 31 adds +6 counts when the motor count becomes "4" owing to the count shift, thereby correcting it to the motor exciting pattern with the motor count "10". Thus, the windings of the stator 13 are supplied with currents in the current supply direction U→W, a motor exciting pattern in the B region at the open valve driving, which makes it possible to prevent the counterrotation from occurring.

On the other hand, at the counterrotation in the open valve direction at the close valve driving, the control unit 31 adds −6 counts when the motor count becomes "12" owing to the count shift, thereby correcting it to the motor exciting pattern with the motor count "6". Thus, the windings of the stator 13 are supplied with currents in the current supply direction V→W, a motor exciting pattern in the A region at the close valve driving, which makes it possible to continue the close valve driving without causing the counterrotation.

FIG. 17 is a diagram illustrating a process of correcting motor counterrotation, which shows a case of applying motor counterrotation correction to the example shown in FIG. 14. If the control unit 31 makes a decision that the brushless motor 1 has the counterrotation of the rotor from the value of the output D of the OR circuit 46, it adds +6 or −6 counts to the motor count as the count correction value in accordance with the counterrotation at the open valve driving or with the counterrotation at the close valve driving.

For example, as shown in FIG. 17(*d*), when the output D becomes H level (see the portion designated by the symbol E7), the motor counterrotation is decided, and the count correction value is added to the motor count at this point of time. Thus, the motor rotation is corrected in the normal direction as shown by the portion designated by the symbol E6 so that the behavior of the rotor 11 represented by the waveforms b and c returns to the behavior following the target waveform a.

Incidentally, as for the single precision motor, even if the positional shift of the rotor 11 occurs, the motor counterrotation does not occur. However, in the same manner as in the double precision motor, the first detecting unit 4*a* and second detecting unit 4*b* can detect the positional shift of the rotor 11 from the signal pattern changes in the mode A or C. In addition, if the positional shift of the rotor 11 is detected from the signal pattern changes in the mode A, or C, the correction can be achieved by adding the foregoing count correction value to the motor count.

As described above, according to the present embodiment 1, when it receives the output pattern of the signals with the prescribed logic level (LLL or HHH) corresponding to a ground short or instantaneous interruption on an output signal line via the output signal lines of the Hall ICs 17, it compares the output patterns of the detection signals of the Hall ICs 17 received before and after the reception of the output pattern, and makes a decision, if the two patterns differ, that there is a possibility of causing a shift of the rotor 11 from the target position and the counterrotation of the rotor 11 involved with it. By thus doing, it can detect an abnormality accurately and quickly that occurs on the output signal line of the Hall ICs 17 for detecting the magnetic pole position of the rotor 11, and that will have significant effect on the driving of the brushless motor 1.

In addition, according to the present embodiment 1, the motor controller 3 for controlling driving of the double precision motor comprises the comparing unit 43*a* for successively receiving the integral values calculated by the integrating unit 42, and for outputting the H level signal indicating counterrotation of the rotor if the integral values are less than a first threshold by a predetermined number of consecutive times; a comparing unit 43*b* for successively receiving the integral values calculated by the integrating unit 42, and for outputting the H level signal by making a decision of the counterrotation of the rotor if the integral values are less than a second threshold which is less than the first threshold by a number of consecutive of times greater than the first comparing unit; a timer 41 for starting counting from a moment of an abnormality decision by a pattern checking unit 40, and for outputting the H level signal indicating the abnormality decision during the counting; an AND circuit 45 for receiving output signals of the timer 41 and comparing unit 43*a* and for performing AND operation between them; and an OR circuit 46 for receiving an AND operation result by the AND circuit 45 and an output signal of the second comparing unit 43*b*, and for outputting an OR operation between them as a final decision result as to the counterrotation of the rotor 11. The configuration makes it possible to quickly detect the occurrence of the counterrotation of the brushless motor 1 due to the abnormality taking place on an output signal line of the Hall ICs 17.

Furthermore, according to the present embodiment 1, if the control unit 31 makes a decision of the counterrotation of the rotor 11, it corrects the counterrotation of the rotor 11 by correcting the motor exciting pattern by correcting the motor count which is the switching sequence of the motor exciting pattern. By thus doing, the present embodiment 1 can correct to the normal direction even if the brushless motor 1 has the counterrotation due to the abnormality occurring on an output signal line of the Hall ICs 17.

INDUSTRIAL APPLICABILITY

A motor controller in accordance with the present invention can detect an abnormality accurately and quickly that occurs on an output signal line of the position detecting unit for detecting the magnetic pole position of the rotor, and that will have significant effect on the driving of a brushless motor. Accordingly, it is suitable for a motor controller of an ECU direct drive model or a drive circuit separate model, which is connected to the brushless motor via a wire harness into which the output signal lines of the position detecting unit are put.

What is claimed is:

1. A motor controller having a driving control unit of a brushless motor that includes a rotor having magnetic pole position detecting magnets attached thereto and a predetermined number of poles, a stator having multiple phase exciting windings, and position detecting units provided in correspondence to individual phases of the stator for detecting magnetic poles of the magnetic pole position detecting magnets and for outputting detection signals with logic levels corresponding to polarities of the magnetic poles, wherein the driving control unit is connected to output signal lines of the position detecting units of the brushless motor, successively receives output patterns based on the detection signals from the position detecting units via the output signal lines, and rotates the rotor by switching current supply to exciting windings of the individual phases of the stator in response to exciting patterns corresponding to the output patterns, the motor controller comprising:

a pattern checking unit for deciding that there is a shift of the rotor from a target position and a counterrotation of the rotor involved with the shift, if an output pattern based on a signal with a prescribed logic level corresponding to a short circuit to or disconnection from ground potential of at least one of the output signal lines is received, and if the output patterns based on the detection signals received before and after the output pattern are found to have different patterns by comparison.

2. The motor controller according to claim 1, further comprising a timer output unit for starting counting from an abnormality decision by the pattern checking unit, and for outputting a signal indicating the abnormality decision during a period of the counting.

3. The motor controller according to claim 1, wherein
the magnetic pole position detecting magnet has a number of magnetic poles twice a number of poles of the rotor; and
the position detecting units comprise Hall elements for detecting magnetic pole positions of the rotor from magnetic fluxes from the magnetic pole position detecting magnets, and the motor controller further comprising:
an integrating unit for multiplying driving duty ratios of pulse width modulation control by the driving control unit and position velocity indicating changes of actual position of the rotor; and
a comparing-deciding unit for comparing an integral value calculated by the integrating unit with a prescribed threshold, and for making a decision of counterrotation of the rotor when the integral value is less than the prescribed threshold.

4. The motor controller according to claim 3, wherein
the comparing-deciding unit successively receives the integral values calculated by the integrating unit, and makes a decision that the rotor makes counterrotation if the integral values are less than a prescribed threshold by a predetermined number of consecutive times.

5. The motor controller according to claim 3, wherein the comparing-deciding unit comprises:
a first comparing-deciding unit for successively receiving the integral values calculated by the integrating unit, and for outputting a signal with a logic level indicative of the counterrotation of the rotor if the integral values are less than a first threshold by a predetermined number of consecutive times; and
a second comparing-deciding unit for successively receiving the integral values calculated by the integrating unit, for making a decision that the rotor makes counterrotation if the integral values are less than a second threshold which is less than the first threshold by a number of consecutive times greater than the first comparing unit, and for outputting the signal with the logic level indicative of the counterrotation, and wherein the motor controller further comprises:
a timer output unit for starting counting from a moment of an abnormality decision by the pattern checking unit, and for outputting a signal with the logic level indicating the abnormality decision during a period of the counting;
an AND circuit for receiving output signals of the timer output unit and of the first comparing unit, and for performing AND operation between them; and
an OR circuit for receiving an AND operation result by the AND circuit and an output signal of the second comparing unit, and for outputting an OR operation between them as a final decision result as to the counterrotation of the rotor.

6. The motor controller according to claim 3, wherein the driving control unit corrects the counterrotation of the rotor by correcting a sequence of switching the motor exciting patterns if the counterrotation of the rotor is decided.

* * * * *